(12) United States Patent
Von Holst et al.

(10) Patent No.: US 11,882,796 B2
(45) Date of Patent: Jan. 30, 2024

(54) METHOD AND ARRANGEMENT FOR PRODUCING SILAGE

(71) Applicant: DEERE & COMPANY, Moline, IL (US)

(72) Inventors: Christian Von Holst, Hettenleidelheim (DE); Stefan Brocke, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 297 days.

(21) Appl. No.: 17/181,062

(22) Filed: Feb. 22, 2021

(65) Prior Publication Data

US 2021/0307364 A1    Oct. 7, 2021

(30) Foreign Application Priority Data

Apr. 7, 2020   (DE) .......................... 102020204475.9

(51) Int. Cl.
*A01F 25/22*    (2006.01)
*A01F 25/16*    (2006.01)

(52) U.S. Cl.
CPC ............ *A01F 25/22* (2013.01); *A01F 25/166* (2013.01)

(58) Field of Classification Search
CPC ............................... A01F 25/166; A01F 25/22
USPC ....................................................... 454/174
See application file for complete search history.

(56) References Cited

FOREIGN PATENT DOCUMENTS

| | | | |
|---|---|---|---|
| CN | 109618685 A | * | 4/2019 |
| CN | 110301538 A | | 10/2019 |
| DE | 3704175 A1 | | 8/1988 |
| DE | 102006005933 A1 | | 8/2007 |
| DE | 102010028707 A1 | | 11/2011 |
| EP | 3403487 A1 | | 11/2018 |
| EP | 3403488 A1 | | 11/2018 |
| FR | 2518970 A1 | | 7/1983 |
| WO | WO2008073841 A2 | | 6/2008 |
| WO | WO2015041556 A1 | | 3/2015 |

OTHER PUBLICATIONS

Translation, CN-109618685-A, Liang et al., Apr. 2019 (Year: 2019).*
Extended European Search Report and Written Opinion issued in European Patent Application No. 21157688.9, dated Aug. 5, 2021, in 07 pages.

* cited by examiner

*Primary Examiner* — Jessica Yuen

(57) ABSTRACT

A method for silaging harvested crops includes distributing and compacting silage consisting of shredded foliage plants in a silo. The silo is then sealed and then fermented in the silo. At least one part of the silage is flushed with an inert gas after an aerobic phase of the fermentation is detected with a first sensor. The inert gas may also be introduced into the silage if a penetration of atmospheric oxygen is detected in the silage with a second sensor.

13 Claims, 2 Drawing Sheets

METHOD AND ARRANGEMENT FOR PRODUCING SILAGE

CROSS-REFERENCE TO RELATED APPLICATIONS

This application claims the benefit of German Patent Application No. 102020204475.9, filed on Apr. 7, 2020, the disclosure of which is hereby incorporated by reference.

TECHNICAL FIELD

The disclosure generally relates to a method and an arrangement for silaging harvested crops.

BACKGROUND

Silage is a type of fodder which is produced from green foliage plants which are stored in a silo and stabilized by acidification. The acidification takes place by means of fermentation. The finished silage may be fed to cows, sheep and other ruminants. The storage and fermentation process is denoted or described as silaging and is carried out by using whole grass plants (not only the seed heads), such as but not limited to maize, sorghum or other cereals.

In the past the fermentation was carried out by indigenous micro-organisms; but nowadays the silage is supplied with ensilage agents in which specific micro-organisms are contained in order to accelerate the fermentation or to improve the silage. Ensilage agents may contain one or more strains of lactic acid bacteria, generally *Lactobacillus plantarum*. Other bacteria used include the species *Lactobacillus buchneri, Enterococcus faecium* and *Pediococcus*.

The silage is stored and covered in the silo, and is accordingly subjected to an anaerobic fermentation, which starts approximately 48 hours after filling the material is stored and covered in the silo. The fermentation converts sugars contained in the plants into acids. The fermentation is substantially terminated or completed after approximately 2 weeks. Before the anaerobic fermentation starts, there is an aerobic phase in which the oxygen contained in the silage is consumed. The packing density of the fodder determines the quality of the silage obtained since because the available atmospheric oxygen component influences the chemical reactions occurring in the silo.

If the fodder is well compacted, the supply of oxygen is limited and the resulting acid-based fermentation causes a decomposition of the carbohydrates present into acetic acid, butyric acid and lactic acid. Such a silage product is denoted as sour silage.

If, however, on the other hand the fodder is not well compacted or loosely deposited or the silo is only filled gradually, the oxidation takes place more rapidly and the temperature rises. The same occurs when the cover of the silage is damaged or when the silo is prematurely opened. In these cases the penetrating oxygen of the air may lead to the production of ammonia or butyric acid and in the worst case the silage may become toxic and may no longer be used as animal fodder. If the fermentation process is not carefully carried out and controlled, therefore, the sour silage takes on an unpleasant odor by excessive production of ammonia or butyric acid (the latter is responsible for the odor of rancid butter). Accordingly, for the production of high quality silage, it is important to compact the fodder sufficiently in order to avoid the negative effect of oxygen pockets.

In order to avoid the described problems in addition to automating the compacting (see EP 3 403 488 A1) it has been proposed in the prior art to generate the silage under vacuum, i.e. to store in a tent, from which subsequently the air is pumped out (DE 10 2006 005 933 A1) or to weld smaller portions of the silage into plastic containers, from which the air is pumped out or which are filled with a protective gas such as nitrogen (DE 37 04 175 A1).

Whilst the compacting, whether it takes place automatically or by human control, may not always ensure the exclusion of oxygen in the silage to a sufficient degree, the pumping out of larger silos in agricultural operations is not economically viable due to the effort in producing an airtight container, and this also applies to filling the silage into plastic containers which are pumped out or filled with protective gas.

The object of the present invention, therefore, is to improve the fermentation process in a silo arranged to a conventional standard in agricultural operations, in an economical manner and in particular to avoid or at least to reduce therein the undesired effect of atmospheric oxygen on the fermentation process.

SUMMARY

A method for silaging harvested crops is provided. The method includes distributing and compacting silage consisting of shredded foliage plants in a silo. The silo is then sealed and then fermented in the silo. At least one part of the silage is flushed with an inert gas after an aerobic phase of the fermentation.

In this manner, by means which are relatively simple and which are also able to be implemented more economically, the negative effects of oxygen from the air on the silage after the aerobic phase of the fermentation (for the explanation thereof reference is made to the introduction to the description) are reduced or prevented by the silage being flushed with the inert gas which, for example, may be nitrogen or a noble gas. It might also be conceivable to introduce the gas already in the aerobic phase, i.e. before the anaerobic phase of the fermentation, into the silo, for example in order to accelerate the aerobic phase.

The end of the aerobic phase may be detected by one or more sensor(s) and may serve for the automatic activation of a valve, the inert gas being conducted thereby from a container through one or more lines into the (entire) silage or a part thereof.

A penetration of atmospheric oxygen into the silage may be detected by a sensor and may serve for the automatic activation of a valve, the inert gas being conducted thereby from a container through one or more lines into the silage. In this case, the entire silo or only the region of the silo in which one or more sensors establish a penetration of atmospheric oxygen may be flushed with gas.

The one or more sensor(s) may be configured to detect the end of the aerobic phase and/or the penetration of oxygen using the temperature of the silage and/or using atmospheric oxygen penetrating one or more reaction products and/or a variable influenced by the reaction products (for example the pH value of the silage) and/or the oxygen directly.

Using the signals of the sensors, the position of an interface at which the silo is opened for removing silage may be identified, so as to prevent on the basis thereof by suitable activation of the valve an opening of the nozzles which would otherwise discharge the gas into empty regions of the silo. Using the signals of the sensors the oxygen component in the silage may also be detected in the vicinity of the interface and if required (when a threshold value is exceeded) gas may be supplied to the respectively adjacent nozzles or all of the nozzles of the silo. In a further embodiment the identification of the interface may also be detected by a camera or any other sensor system and used for controlling the valve.

An arrangement for silaging harvested crops comprises a silo for receiving silage consisting of shredded foliage plants, which comprises a base and a seal for the silage and in which the silage is able to be fermented, wherein means are provided for flushing the silage with an inert gas after an aerobic phase of the fermentation process. The silo is accordingly able to be filled with the silage consisting of the shredded foliage plants and the silage may be compacted in the silo by vehicles or other suitable devices. A further application field of the present invention is a silo tank (vertical silo) which is filled with silage.

The arrangement may be provided with one or more sensor(s) which are configured to detect the end of the aerobic phase of the fermentation of the silage in the silo and which are coupled in a controlling manner to an adjustable valve, as a reaction to the identified end the inert gas being able to be automatically guided thereby from a container through one or more lines into the silage.

The arrangement may be provided with one or more sensor(s) which are configured to detect a penetration of atmospheric oxygen into the silage and which are coupled in a controlling manner to an adjustable valve, as a reaction to the identified penetration of the atmospheric oxygen the inert gas being automatically conducted thereby from a container through one or more lines into the entire silage or only the region of the silo in which a penetration of atmospheric oxygen is established.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
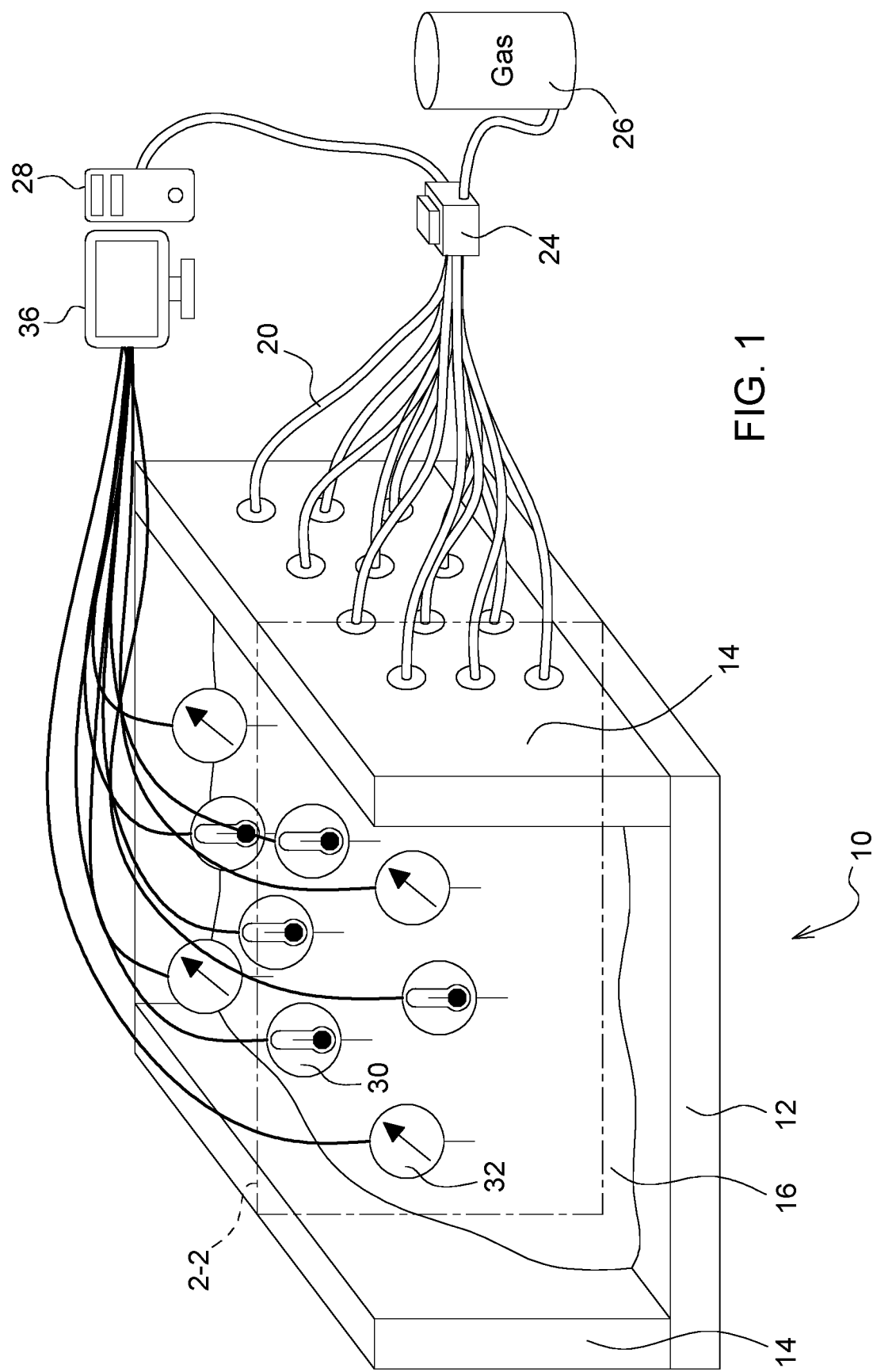
FIG. 1 is a perspective view of a silo.

Referring to the Figures, wherein like numerals indicate like parts throughout the several views, a silo is generally indicated at 10. Referring to FIG. 1, the silo 10 is configured in the form of a so-called bunker silo. The silo comprises a base 12 and lateral walls 14 which are generally all produced from concrete. The silo 10 is designed as a trench silo in which shredded foliage plants are introduced, distributed and compacted as known per se in the prior art (EP 3 403 487 A1, EP 3 403 488 A1, the disclosure thereof being incorporated by way of reference in the present documentation) and therefore is open to the front and to the rear. The shredded foliage plants, denoted hereinafter as silage 16, may be supplied with an ensilage agent during harvesting or during or after storage in order to improve the fermentation. Additionally, after compacting, the silage 16 is covered at the top and toward the open sides of the silo 10 with a film 18 (see FIG. 2) in order to shield the silage from the oxygen in the surrounding air.

Openings through which gas-conducting lines 20 extend are provided in the base 12 and in the walls 14. Nozzles 22 are arranged on the inner sides of the base 12 and the walls 14, the gas supplied into the lines 20 being able to flow through said nozzles into the interior of the silo 10 and thus into the silage 16. The lines 20 are connected to the outlet of a valve 24, the inlet thereof being connected to a container 26 (for example a gas bottle) which is filled with pressurized gas.

It might also be conceivable to conduct the lines 20 through openings in the film 18 in order to supply the silo 10 from above. The lines would also be conducted through openings in the film 18 when the silage 16 is piled up in a heap which is covered at the top and on all sides by film 18. In a further embodiment, the silo is designed as a vertical tank which is filled with the silage. The compacting is carried out in this case by the inherent weight of the silage or additional means and the nozzles 22 are fitted into the base and the walls of the tank.

The valve 24 is controllable by means of a computer 28 which in turn is connected to a first sensor 30 and a second sensor 32, i.e. sensors 30 and 32. The computer 28 could also be designed as a mobile device (smart phone or the like) and wirelessly control the valve 24. The valve 24 may be moved by the computer 28 between at least an open and closed position and in a developed embodiment also into one or more intermediate position(s).

The sensors 30 arranged inside the silage 16 detect the temperature of the silage 16 and the sensors 32 detect specific constituents of the silage 16, in particular those which indicate undesired putrefaction (for example butyric acid or ammonia or the pH value) or serve for detecting oxygen. The sensors 32 may be designed, for example, as near-infrared spectrometers or the like. It might also be possible to detect by means of the sensors 32 the quantity of gas from the container 26 which is located in the surroundings of the sensor 32 in order to be able to close the valve 24 again when a predetermined pressure or gas component is reached.

Figure 2:
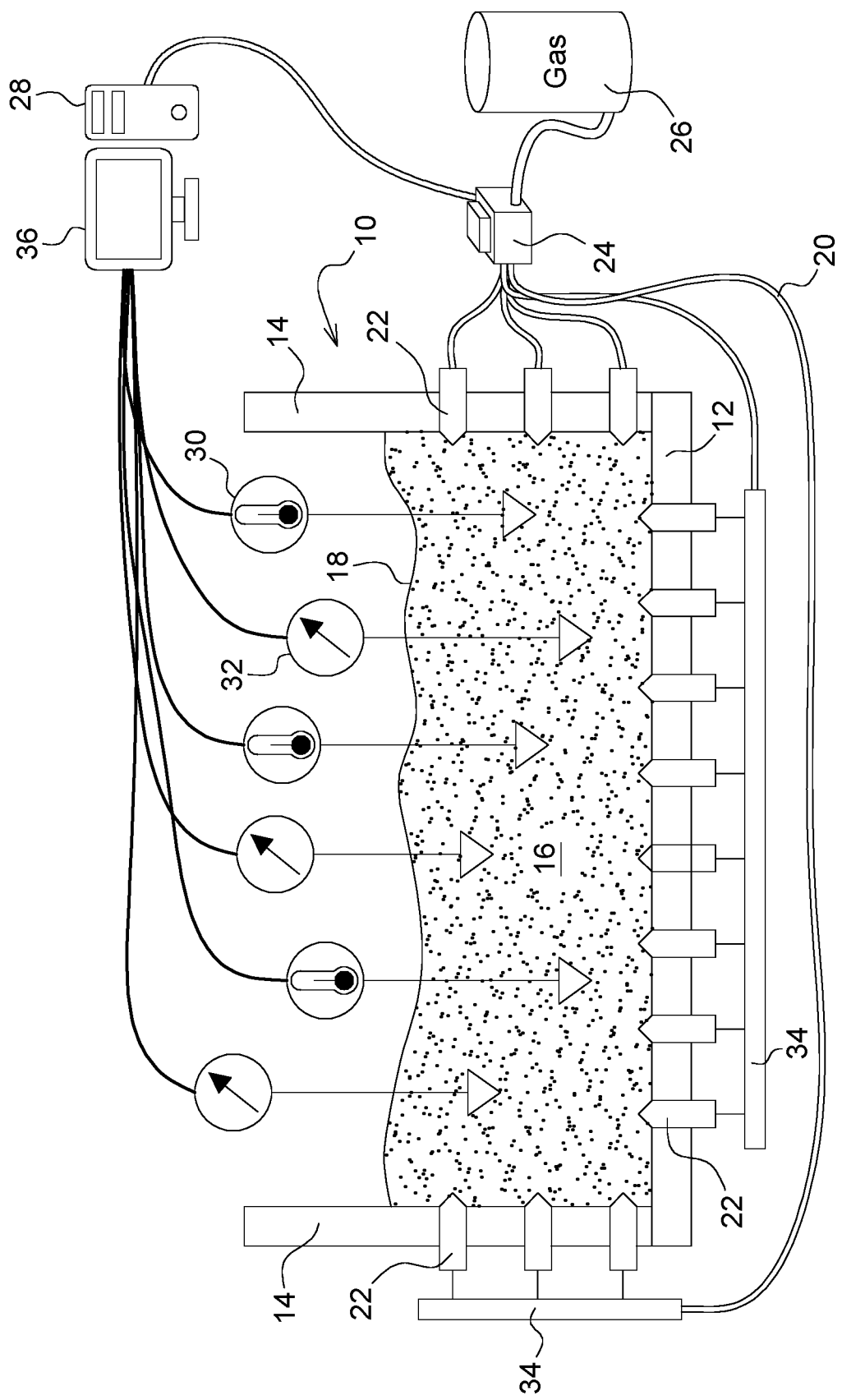
FIG. 2 is a vertical section through the silo along the cut-line 2-2 of shown in FIG. 1.

The sensors 30, 32, as shown in FIGS. 1 and 2, may be connected by cable to the computer 28 (in this case the locations at which said cable passes through the film 18 would be sealed or the cables would be located below the film 18 and laid between the base 12 or the side walls 14, on the one hand, and the film 18, on the other hand, and here a suitable seal is provided in order to avoid the entry of atmospheric oxygen) or the sensors are wirelessly connected to the computer 28 in a signal-transmitting manner, for example by radio waves.

In contrast to that shown in FIGS. 1 and 2, each nozzle 22 and line 20 may be individually assigned a valve 24 or in each case a plurality of nozzles 22 are connected to a bus bar 34 which is assigned a suitable valve 24, as shown in FIG. 2 for the nozzles 22 on the base 12 and on the left-hand wall 14. In other words, the nozzles 22 may be activated individually or in groups by the computer 28 and the valve 24, wherein the groups comprise locally adjacent nozzles 22, whether for the entire base 12 or a part thereof, or for an entire wall 14 or a limited part thereof, with nozzles 22 adjacent vertically or horizontally or in both directions. Also conceivable might be a simultaneous supply of all nozzles 22 by means of a single valve 24. A pressure regulator (not shown) may also be provided upstream or downstream of the valve 24 or integrated therein.

The gas in the container 26 is a chemically inactive (inert) gas such as a noble gas (helium, argon, etc.) or nitrogen. The silo 10, after being filled with the silage 16 and the compacting thereof and being covered with the film 18 and the termination of the aerobic phase of the fermentation, is thus filled with the gas in order to prevent the silage 16 from being spoiled by possibly penetrating atmospheric oxygen.

The supply of gas to the silo 10 may be carried out in the simplest case by a user input into the computer 28, for example when after observing the silo 10 the farmer comes to the conclusion that the aerobic phase is terminated. In addition, it might also be conceivable to dispense with the sensors 30, 32 and the computer 28 and to actuate the valve 24 by hand. In a developed embodiment, however, using the signals of the sensors 30 and/or 32 the computer 28 identifies the end of the aerobic phase and opens the valve 24, optionally according to a display of the intended filling of the silo 10 with the gas on a user interface 36, and a confirmation input being obtained from the farmer by means of a keyboard, or the like.

In this case, the filling of the silo 10 with gas with individual or group activation of the nozzles 22 initially takes place from below (by supplying the nozzles 22 arranged below) when the gas in the container 26 is lighter than air, such as for example in the case of helium, or similarly from above, by supplying the nozzles 22 arranged above when the gas in the container 26 is heavier than air. The gas which flows in potentially displaces atmospheric oxygen still present in the silage 16 or penetrating through a leak in the film 18 or between the film 18 and the walls 14 or the base 12 and prevents undesired putrefaction processes in the silage.

It might alternatively or additionally also be conceivable to supply the silage 16 with the gas from the container 26 only when undesired reactions occur or may occur in the silage due to atmospheric oxygen (for example in the case of directly establishing oxygen by means of a sensor 32), which is able to be identified by the computer 28 using the signals of the sensors 30, 32 distributed over the entire silo 10. In this case, either the entire silo 10 is supplied with gas or only the nozzles 22 which are adjacent to the adjacent sensor(s) 30 and/or 32, establishing the undesired reaction or the possibility thereof, are supplied individually or in groups. Additionally, based on the signals of the sensors 30, 32 a warning message may be provided on the user interface 36 relative to the position and optionally the size of the leakage, so that if required the farmer is able to seal the leakage. The sensors 30 detect possible temperature rises which indicate an undesired reaction and the sensors 32 detect the products of an undesired reaction (indirect detection) and/or penetrating atmospheric oxygen (direct detection). The sensors 32 could also be designed as sensors for detecting the pH value of the silage 16 which is also influenced by penetrating atmospheric oxygen.

The signals of the sensors 30, 32 may also serve to identify the position of an interface at which the silo 10 is opened for removing silage 16, so as to prevent on the basis thereof (with individual or group activation of the nozzles 22) an opening by means of the computer 28 and the valve 24 of the nozzles 22 which otherwise would discharge the gas into empty regions of the silo 10 (no longer filled with silage 16). Alternatively or additionally, the sensors 30, 32 serve to detect the oxygen component in the silage 16 (and/or undesired reaction products such as butyric acid or ammonia, see above) in the vicinity of the interface and if required to supply gas from the container 26 to the respectively adjacent nozzles 22 or as a precaution all of the nozzles 22 of the silo 10 (optionally with the exception of the nozzles 22, which would discharge their gas into the regions of the silo 10 which are already empty).

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An arrangement for silaging harvested crops, the arrangement comprising:
   a silo for receiving silage, the silage including shredded foliage plants;
   wherein the silo includes a base and a seal covering the base such that fermentation of the silage may occur;
   a valve controllable between a closed position and an open position, wherein the valve is configured to introduce an inert gas into the silo when disposed in the open position to flush the silage with the inert gas after an aerobic phase of fermentation is substantially complete; and
   a first sensor configured to detect the end of the aerobic phase of the fermentation of the silage in the silo, the first sensor coupled to a computer that is operable to control the valve between the open position and the closed position when the end of the aerobic phase of the fermentation of the silage is detected.

2. The arrangement set forth in claim 1, further comprising a second sensor configured to detect a penetration of atmospheric oxygen into the silage, the second sensor coupled to the computer, wherein the computer is operable to control the valve between the open position and the closed position when the penetration of atmospheric oxygen into the silage is detected.

3. The arrangement set forth in claim 1, further comprising a container including the inert gas, the container coupled to the valve for supplying the inert gas.

4. The arrangement set forth in claim 1, further comprising a line extending from the valve into the silage within the silo for conducting the inert gas into the silage.

5. The arrangement set forth in claim 4, wherein the line includes a nozzle positioned for injecting the inert gas into the silage.

6. The arrangement set forth in claim 4, wherein the line includes a plurality of nozzles, with each nozzle positioned for injecting the inert gas into a respective region of the silo.

7. The arrangement set forth in claim 6, wherein the computer is disposed in communication with the valve and the plurality of nozzles, wherein the computer is configured to selectively control the valve and the plurality of nozzles to introduce the inert gas into only one of the plurality of regions through a respective one of the plurality of nozzles.

8. An arrangement for silaging harvested crops, the arrangement comprising:
   a valve controllable between a closed position and an open position, wherein the valve is configured to introduce an inert gas into a silo when disposed in the open position to flush silage with the inert gas after an aerobic phase of fermentation is substantially complete;
   a first sensor configured to detect the end of the aerobic phase of the fermentation of the silage in the silo; and
   a computer disposed in communication with the valve and the first sensor, wherein the computer is operable to control the valve between the open position and the closed position when the end of the aerobic phase of the fermentation of the silage is detected.

9. The arrangement set forth in claim 8, further comprising a second sensor configured to detect a penetration of atmospheric oxygen into the silage, wherein the second sensor is coupled to the computer, and wherein the computer is operable to control the valve between the open position and the closed position when the penetration of atmospheric oxygen into the silage is detected.

10. The arrangement set forth in claim 8, further comprising a line configured to extend from the valve into the silage within the silo for conducting the inert gas into the silage.

11. The arrangement set forth in claim 10, wherein the line includes a nozzle configured for injecting the inert gas into the silage.

12. The arrangement set forth in claim 11, wherein the line includes a plurality of nozzles, with each nozzle configured for injecting the inert gas into a respective region of the silo.

13. The arrangement set forth in claim 12, wherein the computer is disposed in communication with the plurality of nozzles, wherein the computer is configured to selectively control the valve and the plurality of nozzles to introduce the inert gas into only one of the plurality of regions through a respective one of the plurality of nozzles.

* * * * *